United States Patent [19]

Lucas

[11] Patent Number: 4,755,578

[45] Date of Patent: Jul. 5, 1988

[54] ALKOXY-FUNCTIONAL ONE-COMPONENT RTV SILICONE RUBBER COMPOSITIONS

[75] Inventor: Gary M. Lucas, Scotia, N.Y.

[73] Assignee: General Electric Company, Waterford, N.Y.

[21] Appl. No.: 26,241

[22] Filed: Mar. 16, 1987

Related U.S. Application Data

[60] Division of Ser. No. 832,505, Feb. 21, 1986, Pat. No. 4,670,532, which is a division of Ser. No. 755,954, Jul. 16, 1985, Pat. No. 4,593,085, which is a continuation of Ser. No. 449,105, Dec. 13, 1982, abandoned.

[51] Int. Cl.$^4$ .............................................. C08G 77/06
[52] U.S. Cl. ..................................... 528/17; 525/477; 528/18; 528/19; 528/21; 528/33; 528/34; 528/901
[58] Field of Search .................. 528/17, 18, 33, 34, 528/19, 21, 901; 525/477

[56] References Cited

U.S. PATENT DOCUMENTS

| | | | |
|---|---|---|---|
| 4,551,516 | 11/1985 | Kitamura et al. | 528/34 |
| 4,593,085 | 6/1986 | Lucas | 528/17 |
| 4,670,532 | 6/1987 | Lucas | 528/21 |

*Primary Examiner*—Melvyn I. Marquis

[57] ABSTRACT

The present invention relates to an alkoxy-functional one-component RTV system in which the base polymer composition comprises a polyalkoxy-terminated diorganopolysiloxane polymer and a mono alkoxy-terminated diorganopolysiloxane polymer. In an alternate embodiment, the base polymer composition comprises a diorganopolysiloxane polymer having just one alkoxy group and at least one hydrolyzable leaving group on the terminal silicon atoms.

29 Claims, No Drawings

ALKOXY-FUNCTIONAL ONE-COMPONENT RTV SILICONE RUBBER COMPOSITIONS

This application is a division of application Ser. No. 832,505, filed on Feb. 21, 1986, now U.S. Pat. No. 4,670,532, which is a division of application Ser. No. 755,954, filed July 16, 1985, now issued as U.S. Pat. No. 4,593,085 on June 3, 1986, which is a continuation of application Ser. No. 449,105, filed Dec. 13, 1982, now abandoned.

BACKGROUND OF THE INVENTION

The present invention relates to one-component RTV silicone rubber compositions and more particularly, the present invention relates to alkoxy-functional one-component RTV silicone rubber compositions in which the base polymer composition comprises a blend of polyalkoxy functional polymers and mono-alkoxy functional polymers.

There are a large number of one-component RTV (RTV shall be used hereinafter to refer to room temperature vulcanizable) silicone rubber compositions. One type of such one-component RTV silicone rubber composition comprises an alkoxy-functional system in which the cross-linking agent is polyalkoxy silane. An example of such one-component alkoxy-functional RTV composition is that disclosed in BEERS, U.S. Pat. No. 4,100,129 and Brown, U.S. Pat. No. RE 29,760. The BEERS patent discloses the basic system of a silanol end-stopped polymer, a polyalkoxy silane cross-linking agent such as methyltrimethoxysilane and preferably a titanium chelate catalyst. Such a composition has the advantages of being non-corrosive and not emitting pungent odors upon curing as is the case with some of the other types of RTV silicone rubber compositions. However, such a composiiton has the disadvantage that even with the titanium catalyst, it is not as fast curing as would be desirable. In addition, it has a shelf stability problem; that is, even though it will cure after storage, in some cases various agents had to be added to it for that purpose. Further, it was found that even if such compositions did cure, nevertheless, the cure rate was slowed considerably. In some cases after prolonged storage, it was found that compositions did not cure at all. The reason for the retardation in the cure rate of such compositions was the fact that the free hydroxyl groups in the RTV system results in the degradation of the alkoxy radicals at the terminal ends of the diorganopolysiloxane base polymer in the composition. As a result, the composition will not cure or cross-link properly or at a sufficient rate to give a final cured composition with desirable physical properties.

Accordingly, inventions were made or effected to make such compositions more shelf-stable which included the addition of various ingredients or various types of procedures in the preparation of such compositions. An example of the production or the making of such compositions such that they are shelf-stable, is to be found in the patent of White, et al, U.S. Pat. No. 4,395,526, which discloses the use of scavengers; and which scavengers will react with and tie up unbonded hydroxy groups in the substantially anhydrously packaged composition. As a result of the scavenger tying up or bonding with such hydroxy groups in a composition, the hydroxy groups will not attack the alkoxy radicals on the terminal silicon atoms of the polyalkoxy base polymer and the composition will be shelf-stable and as a result, fast curing even after prolonged periods of storage.

U.S. Pat. No. 4,395,526 also discloses the utilization of various integrated cross-linkers, scavengers which will function as cross-linking agents for reacting with the silanol groups in the base polymer terminating the polyalkoxy-formed polysiloxane polymer with such scavenging and alkoxy groups such that the polymer will be able to cross-link and cure upon being exposed to atmospheric moisture. In addition, such integrated cross-linkers, scavengers acted as scavengers for scavenging or reacting with the free hydroxyl groups in the system so that they will not be able to degrade the alkoxy groups in the base polymer system.

Another application in this area is that of CHUNG, U.S. Pat. No. 4,424,157, which discloses the use of certain cyclic amides for that purpose. Other applications are that of LUCAS, U.S. Pat. No. 4,483,973, which discloses certain adhesion promoters for the systems of the WHITE, et al, patent and that of DZIARK, U.S. Pat. No. 4,417,042, which discloses the utilization of certain silazane scavengers as pure scavengers for the polyalkoxy terminated polymers of the WHITE, et al, U.S. Pat. No. 4,395,526. In addition, there is the Patent of BEERS, U.S. Pat. No. 4,513,115 which discloses the utilization of certain additives to the system of WHITE, et al, and DZIARK which will make these compositions low-modulus as well as fast-curing and shelf-stable.

Then there is the integrated cross-linker, scavenger or pure scavenger alkoxy functional silazanes of BEERS, et al, U.S. Pat. No. 4,720,531, as well as the end-coupling catalyst for producing the base polymer in all such systems as disclosed in CHUNG, U.S. Pat. No. 4,515,932. There is further disclosed the production of such polymers continuously by preparing them in a static mixer and then a devolatilizing extruder as set forth in CHUNG, et al, U.S. Pat. No. 4,528,324. Finally, there is the Patent of LUCAS, U.S. Pat. No. 4,599,394, entitled "Process for Producing Alkoxy-Terminated Polysiloxanes."

All of these patent applications relate to various aspects of such systems and such one-component alkoxy-functional RTV systems in which there is utilized a scavenger or integrated scavenger, cross-linker to tie up free hydroxy groups in the RTV system such that they will not degrade the alkoxy groups in the base polymer or base polymers and such that the shelf-stability of the composition will not suffer and such that the composition will be fast-curing. In some of these patent applications it is disclosed that there can be tolerated a certain amount of mono-alkoxy terminated polymer in the base polymer composition. While this is true, these patent applications do not disclose how much of the monoalkoxy polymer can be tolerated and in what systems it can be tolerated. The present application relates to and discloses the discovery of how much of such diorganopolysiloxane polymers which are terminated solely with mono-alkoxy groups can be tolerated in the polymer mixture in one-component RTV systems. Further, there is disclosed other systems in which such mono-alkoxy termination can be utilized within the scope of the instant invention. There is the disclosure of NITZSCHE, et al, U.S. Pat. No. 3,127,363. However, this disclosure relates to just mono-alkoxy-terminated polymers which it is stated will not cure without a cross-linking agent.

Accordingly, it is one object of the present invention to provide a fast-curing, shelf-stable, one-component alkoxy functional RTV system in which there is present, in the base polymer blend, a certain amount a mono-alkoxy terminated diorganopolysiloxane polymer species.

It is another object of the present invention to provide for an alkoxy-functional one-component RTV system in which there is present in the base polymer species, a mono-alkoxy terminated diorganopolysiloxane polymer in which the terminal silicon atoms have a scavenging leaving group.

It is still a further object of the present invention to disclose a process for producing an alkoxy-functional one-component RTV system which is fast curing and shelf-stable and in which the base polymer species has a certain amount of mono-alkoxy terminated diorganopolysiloxane polymer species.

It is yet a further object of the present invention to disclose a process for producing an alkoxy-functional one-component RTV system in which the base polymer species and compositions comprises a mono-alkoxy terminated diorganopolysiloxane polymer having terminal silicon atoms which in addition to just the one alkoxy group, have at least one hydrolyzable scavenging leaving group.

These and other objects of the present invention are accomplished by means of the disclosures set forth herein below:

SUMMARY OF THE INVENTION

In accordance with the above objects and as encompassed by the present invention, there is provided an alkoxy-functional one-component RTV silicone rubber composition, comprising, (A) 50 to 99 parts by weight of a first diorganopolysiloxane polymer terminated on each end of the polymer chain with at least 2 alkoxy radicals and having a viscosity varying from 100 to 1,000,000 centipoise at 25° C. where the organo groups are $C_{1-13}$ monovalent hydrocarbon radicals;

(B) from 1 to 50 parts by weight of a second diorganopolysiloxane polymer having on each terminal silicon atom in the polymer chain just one alkoxy group and having a viscosity varying in the range of 100 to 1,000,000 centipoise at 25° C. where organo groups are $C_{1-13}$ monovalent hydrocarbon radicals, and (C) an effective amount of a condensation catalyst.

There may be certain variations made to this composition as will be explained below. In a slight alternative embodiment there is disclosed by the present invention an alkoxy-functional one-component RTV silicone rubber composition comprising as the base polymer species, diorganopolysiloxane polymers having a viscosity in the range of 100 to 1,000,000 centipoise at 25° C. and having just one alkoxy group in each terminal silicon atom in the polymer chain and having at least one hydrolyzable leaving group on each terminal silicon atom in the polymer chain which hydrolyzable leaving group is selected from the group consisting of silazy, cyclic amido, amido, amino, carbamato, enoxy, imidato, isocyanato, oximato, thioisocyanato and ureido radicals and where the organo in the diorganopolysiloxane polymer is a $C_{1-13}$ monovalent hydrocarbon radical and there is present an effective amount of condensation catalyst.

The condensation catalyst is preferably a tin condensation catalyst. It should be noted that none of these polymers will function like an RTV composition with sufficient tensile strength and elongation if there is not present a condensation catalyst and more preferably, a tin condensation catalyst. It also must be mentioned that there is disclosed in the present invention the process of producing the above RTV silicone rubber compositions as will be explained below.

Further, there is encompassed in the present invention variations that may be made to the basic polymer system depending on which polymers are utilized. However, such systems will be described in detail below.

DESCRIPTION OF THE PREFERRED EMBODIMENT

The first polymer composition in an all-alkoxy functional system irrespective of whether there is a scavenger present in the composition or not. The first composition comprises a diorganopolysiloxane polymer terminated at each end of the polymer chain by at least two alkoxy radicals and having a viscosity varying from 100 to 1,000,000 centipoise at 25° C. and more preferably having a viscosity varying from 5,000 to 200,000 centipoise at 25° C. where the organic group is a $C_{1-13}$ monovalent hydrocarbon radical. Such polymer preferably has the formula,

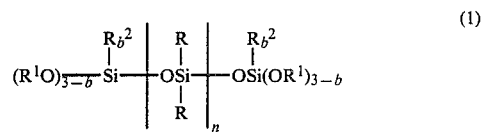

(1)

where R is independently selected from a $C_{1-13}$ monovalent hydrocarbon radical, $R^1$ is independently selected from a $C_{1-13}$ monovalent hydrocarbon radical and $R^2$ is independently selected from a $C_{1-13}$ monovalent hydrocarbon radical, n is a whole number which varies from 50 to 2,500, and b is a whole number that is 0 or 1.

The terminal silicon atom in such a polymer must have at least two alkoxy groups and can have as many as three alkoxy groups in accordance with the above description. Further, there can be a certain amount of alkoxy groups in the polymer chain and/or silanol groups in the polymer chain. It should be noted that such silanol groups in the polymer chain are not desired since they promote degradation of the alkoxy groups. Further, if through the end-capping process, the silanol groups in the polymer chain are converted to alkoxy groups, such groups can be tolerated in small amounts.

It is preferred that most of the polymer species of the composition have alkoxy or silanol groups in the polymer chain or have a very small amount of alkoxy or silanol groups in the polymer chain. If the amount of alkoxy groups in the polymer chain are too great, then there will be a very high amount of cross-linking when the composition cures and this may result in undesirable properties in the cured elastomer.

The second polymer in the foregoing alkoxy polymer mixture comprises a polymer of the formula,

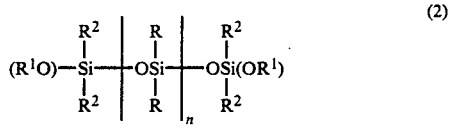

where R, $R^1$, $R^2$ and n are as previously defined.

In the foregoing formula of the second polymer, that is the polymer of Formula (2), the polymer has just one alkoxy group on the terminal silicon atoms. In the base polymer blend there can be tolerated from 1 to 50 parts by weight of the polymer of Formula (2) per 50 to 99 parts by weight of the polymer of Formula (1) in the all alkoxy based polymer system. Above 50 parts by weight of the polymer of Formula (2) in combination with 50 parts of the polymer of Formula (1), the cured silicone elastomer produced from this mixture of polymers has a cheesy composition and undesirable cured physical properties.

Again, the polymer of Formula (2) may have alkoxy groups or silanol groups in the polymer chain as stated with respect to the polymer of Formula (1). These are desirable only in small amounts, such that they do not degrade the alkoxy groups in the polymer blend in the case of silanol groups or do not over cross-link the system in the case of alkoxy groups. Such silanol groups are obtained as a result of being present in the silanol terminated diorganopolysiloxane polymer that is used to form the compounds of Formula (1) and (2) as explained below; and will result in being converted to alkoxy groups when there is sufficient cross-linking agent during the end-capping process as will be explained below. Again, preferably the compound of Formula (2) has a viscosity in the range of 5,000 to 200,000 centipoise at 25° C. With respect to such viscosity values, the "n" value of the compound of Formula (1) and (2) preferably varies in the range of 500 to 2,000.

The other necessary ingredient in the composition is a condensation catalyst and preferably a tin condensation catalyst. More will be said below about the types of condensation catalyst that can be utilized in the instant composition. However, it is necessary to state at this point that a condensation catalyst is necessary if the composition is to cure like an RTV silicone rubber composition and to have the physical properties similar to RTV compositions, that is, tensile strength, elongation, tear and durometer hardness. Such an all alkoxy system with a condensation catalyst with or without other ingredients such as fillers, plasticizers, sag control agents, adhesion promoters, etc. as will be explained below is not presently known in the art.

In combination with the foregoing polyalkoxy and monoalkoxy polymers of Formulas (1) and (2), there may be an effective amount of scavenger. It should also be specified that the foregoing compounds of polymers of Formula (1) and (2) may be blends of polymer species having different viscosities. It is only necessary in accordance with this invention that the blends of the polymer species have a viscosity in the ranges indicated above and that the final blend of alkoxy-terminated diorganopolysiloxane polymer species have a viscosity in the range of 100 to 1,000,000 centipoise at 25° C. and more preferably a viscosity in the range of 5,000 to 200,000 centipoise at 25° C.

The scavenger can be any scavenger that is known in the art. A scavenger in this application is defined as any compound having a functional group that will tie up and react with free hydroxyl groups in the composition and bond with the hydroxyl groups and prevent them from reacting with alkoxy groups in the composition. In this respect, the scavenger can be an integrated cross-linker, scavenger as will be explained below which contains alkoxy groups as well as scavenging groups in which the alkoxy groups can be utilized to further end-cap the silanol diorganopolysiloxane polymer with alkoxy groups such that the diorganopolysiloxane polymer can cross-link and form a RTV elastomer as will be explained below. Accordingly, the scavenger may be selected from non-cyclic silanol scavengers of the formula,

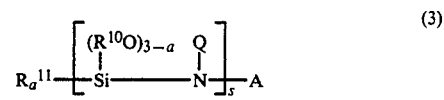

and cyclic silyl nitrogen scavengers having at least one or all of the units of the formula,

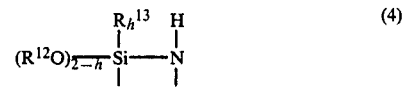

and the rest of the units if any, having the formula,

where $R^{10}$ is a $C_{1-8}$ aliphatic organic radical selected from the group consisting of alkyl, alkylether, alkylester, alkylketone, alkylcyano, and aryl, $R^{11}$ is a $C_{1-8}$ monovalent substituted or unsubstituted hydrocarbon radical, Q is selected from hydrogen, $C_{1-8}$ monovalent substituted or unsubstituted hydrocarbon radical and radicals of the formula,

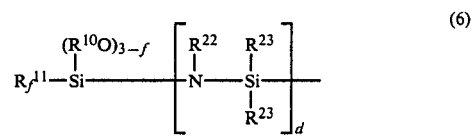

where $R^{10}$ and $R^{11}$ are as previously defined, where a varies from 0 to 2, f varies from 0 to 3, h is 0 or 1, where s is a whole number that varies from 1 to 25, d is a whole number that varies from 1 to 25, $R^{22}$ is selected from hydrogen and $C_{1-8}$ monovalent hydrocarbon radicals and $R^{23}$ is independently selected from $C_{1-8}$ hydrocarbon and hydrocarbonoxy radicals, A is selected from the class consisting of hydrogen and $C_{1-8}$ monovalent substituted or unsubstituted hydrocarbon radicals and radicals of the formula,

where $R^{10}$, $R^{11}$ are as previously defined, g varies from 0 to 3 and in the above scavengers there is at least one hydrocarbonoxy group in the molecule, $R^{12}$ is defined the same as $R^{10}$, and $R^{13}$ is defined the same as $R^{11}$, and $R^{14}$ is defined the same as $R^{11}$.

The foregoing scavenger which can be any scavenger of the foregoing formulas, can be either an integrated cross-linker, scavenger or just a scavenger, depending on the alkoxy groups it has in the molecule. Either type can be utilized with the instant polyalkoxy base polymers of Formulas (1) and (2). For more information as to such scavenging compounds, and to their use in alkoxy-functional RTV compositions, one is referred to the disclosure of BEERS, et al, Ser. No. 912,641, filed Sept. 26, 1986, which is hereby incorporated by reference.

Another silane scavenger that can be used in this new composition which is a pure scavenger for hydroxy-functional groups is a silicon-nitrogen compound selected from the class consisting of, (A) a silicon-nitrogen compound having the formula, $$(Y)(R''')_2SiNSi(R''')_2(Y) \quad (8)$$
$$\overset{R''}{|}$$

where Y is selected from $R'''$ and $R_2''N-$ and (B) a silicon-nitrogen polymer comprising (1) from 3 to 100 mole percent chemically combined structural units selected from the class consisting of the formula,

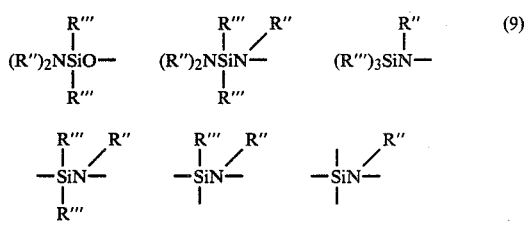

and (2) from 0 to 97 mole percent chemically combined structural units represented by the formula, $$(R''')_cSiO_{\frac{4-c}{2}} \quad (10)$$

and mixtures thereof where the silicon atoms of said silicon-nitrogen polymer are joined to each other by a member selected from an SiOSi linkage and a SiNR"Si linkage, the free valances of said silicon atoms other than those joined to oxygen to form a siloxy unit and nitrogen to form a silazy unit are joined to a member selected from an $R'''$ radical and $(R'')_2N$ radical, and where the ratio of the sum of said $R'''$ radicals and said $(R'')_2N$ radicals to the silicon atoms of said silicon-nitrogen polymer has a value of 1.5 to 3, inclusive, and $R''$ is a member selected from the class consisting of hydrogen and monovalent hydrocarbon radicals, and fluoroalkyl radicals, $R'''$ is a member selected from hydrogen, monovalent hydrocarbon radicals and fluoroalkyl radicals, and c is a whole number equal to 0 to 3, inclusive.

Optionally, there is also an effective amount of a curing accelerator selected from the group consisting of substituted guanidines, amines and mixtures thereof. The above silazane compounds are pure scavengers and cannot be used as integrated cross-linker, scavengers. However, they can be used in desirable quantities in the instant RTV composition produced with the base polymer of Formula (1) and (2) to scavenge hydroxy groups. A cure accelerator may also be used with such compositions as disclosed in the Patent of WHITE, et al, U.S. Pat. No. 4,395,526. For more information as to such scavenging compounds and their use in alkoxy functional RTV systems, one is referred to the disclosure of DZIARK, U.S. Pat. No. 4,417,042, which is hereby incorporated by reference.

Another class of scavenging compounds that can be utilized as scavengers for hydroxy-functional groups with the RTV composition formed with the polymers of Formulas (1) and (2) is a silane scavenger for hydroxy functional groups having the formula, $$(R^1O)_{4-(c+f)}Si(X)_f \quad (11)$$
$$\overset{(R^2)_c}{|}$$

where $R^1$ is a $C_{1-8}$ aliphatic organic radical selected from the group consisting of alkyl, alkylether, alkylester, alkylketone, and alkylcyano radicals, or a $C_{7-13}$ aralkyl radical, $R^2$ is a $C_{1-13}$ monovalent substituted or unsubstituted hydrocarbon radical, X is a hydrolyzable leaving group selected from the group consisting of silazy, cyclic amido, amido, amino, carbamato, enoxy, imidato, isocyanato, oximato, thioisocyanato and ureido radicals and, c is a whole number equal to 0 to 3 inclusive, f is an integer equal to 1 to 4 inclusive and the sum of $c+f$ is equal to 1 to 4 inclusive.

An integrated cross-linker, scavenger within the above formula is a silane scavenger having the formula, $$(R^1O)_{4-(b+a)}Si(X)_a \quad (12)$$
$$\overset{(R^2)_b}{|}$$

where $R^1$ is a $C_{1-8}$ aliphatic organic radical selected from the group consisting of alkyl, alkylether, alkylester, alkylketone and alkylcyano radicals, or a $C_{7-13}$ aralkyl radical, $R^2$ is a $C_{1-13}$ monovalent substituted or unsubstituted hydrocarbon radical, X is a hydrolyzable leaving group selected from the group consisting of silazy, cyclic amido, amido, amino, carbamato, enoxy, imidato, isocyanato, oximato, thioisocyanato and ureido radicals; and, a is an integer equal to 1 to 2 inclusive, b is a whole number equal to 0 to 1 inclusive, and the sum of $b+a$ is equal to 1 to 2 inclusive and the silane is both the silane scavenger for hydroxy-functional groups and a polyalkoxysilane cross-linking agent.

Further, there may be present in such compositions per 100 parts of the blend of the polymers of Formulas (1) and (2) from 0.1 to 10 parts by weight of a polyalkoxysilane having the formula, $$(R^1O)_{(4-b)}Si \quad (13)$$
$$\overset{(R^2)_b}{|}$$

where $R^1$ is a $C_{1-8}$ aliphatic organic radical selected from the group consisting of alkyl, alkylether, alkylester, alkylketone and alkylcyano radicals, or a $C_{7-13}$ aralkyl radical, $R^2$ is a $C_{1-13}$ monovalent substituted or unsubstituted hydrocarbon radical, and b is a whole number equal to 0 to 1.

Such a cross-linking agent of the above formula is used in the composition in an effective amount so as to increase the cross-linking density of the composition and result in a composition of a higher tensile strength. Generally such excess cross-linking agent may be added in the amounts of 0.1 to 10 parts by weight per 100 parts by weight of the polymer blend of Formulas (1) and (2).

In addition, there may be present an effective amount of curing accelerator selected from the group consisting of substituted quanidines, amines and mixtures thereof. Preferably the tin catalyst can be any tin catalyst such as one selected from a class of dibutyl tin dioxide and dibutyl tin diacetate. However, more will be said in the description below as to the types of other ingredients that may be added in the composition and the types of tin catalysts or other condensation catalysts that may be added to the composition.

Preferably, the excess cross-linking agent that is added is methyltrimethoxysilane since it is the most common and inexpensive cross-linking agent to obtain. For more information as to such compositions, that is, the amounts of scavenging agents and types of scavenging agents, the excess cross-linking agent that has been disclosed above, one is referred to the disclosure of WHITE, et al, U.S. Pat. No. 4,395,526.

In a slightly different embodiment, the composition of this embodiment may have a first polymer which has the formula,

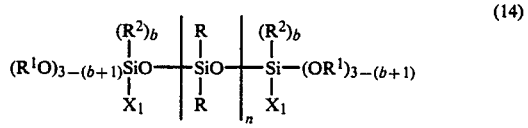
(14)

where R is independently selected from a $C_{1-13}$ monovalent radical, $R^1$ is independently selected from a $C_{1-13}$ monovalent hydrocarbon radical and $R^2$ is independently selected from a $C_{1-13}$ monovalent hydrocarbon radical, b is a whole number that is 0 or 1, and l is a whole number that is 1 or 2 and the sum of (b+1) is always 2 and n is a whole number that varies from 50 to 2,500, where X is a hydrolyzable leaving group selected from the group consisting of silazy, cycloamido, amido, amino, carbomato, enoxy, imidato, isocyanato, oximato, thioisocyanato and ureido radicals.

More will be said below as to the manner in which such polymers are produced. However, for the purposes of the present invention, it should be noted that the polyalkoxysilane terminated diorganopolysiloxane of Formula (1) may be substituted with a monoalkoxy diorganopolysiloxane polymer having at least one hydrolyzable leaving group as defined below in the terminal silicon atoms and preferably having Formula (14). Such a polymer will form an RTV composition with desirable cured properties irrespective of whether the first polymer in the polymer system is the polymer of Formula (1) or Formula (14). Again, this polymer may be a blend of polymers and generally may have a viscosity in the range of 100 to 1,000,000 centipoise at 25° C. and more preferably has a viscosity in the range of 5,000 to 200,000 centipoise at 25° C.

The polymer of Formula (1) is produced by reacting a silanol terminated diorganopolysiloxane polymer having a viscosity in the range of 100 to 1,000,000 centipoise at 25° C. where the organic group is a monovalent hydrocarbon group with a polyalkoxy cross-linking agent of the formula

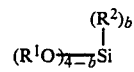

in the presence of an end-coupling catalyst where $R^1$, $R^2$ and b are as previously defined.

The second polymer of Formula (2) is formed by reacting in a second mixture a silanol-terminated diorganopolysiloxane polymer having a viscosity in the range of 100 to 1,000,000 centipoise at 25° C. where the organic group is a monovalent hydrocarbon radical with a dialkoxysilane of the formula

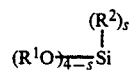

in the presence of an end-coupling catalyst where the $R^1$ and $R^2$ is as previously defined, and s is a whole number that is 2. Such reactions produce the polymers of Formulas (1) and (2). The silanol terminated polymer preferably has the formula,

(16)

where R is as previously defined and n is a whole number that varies from 50 to 2500 and more preferably varies from 500 to 2,000. Preferably "n" varies such that the viscosity of the polymer varies from 100 to 1,000,000 centipoise at 25° C. and more preferably varies from 5,000 to 200,000 centipoise at 25° C. Again this silanol polymer in either one or the other mixtures can have silanol groups in the polymer chain which will be most likely converted to alkoxy groups after the end-coupling reaction. However, such silanol groups should be in small amounts in the polymer chain otherwise undesirable cross-linking will take place in the polymer system, upon curing. The end coupling reaction or the above reaction in the production of the polymers of Formulas (1) and (2) can be carried out in a segregated manner in that each reaction is carried out by itself or both reactions can be carried on in the same mixture with the appropriate amounts of the two types of cross-linking agents since the silanol-terminated diorganopolysiloxane polymer is the same in both cases. It is only necessary that the final alkoxy-terminated polymers be within the concentration ranges indicated previously. It should be noted that the preferred range for the monoalkoxy terminated diorganapolysiloxane polymer of Formula (2) is at a concentration of 1 to 10 parts per 90 to 99 parts of the polymer of Formula (1).

The end-coupling reaction is simply carried out by mixing the alkoxy silane with the silanol terminated diorganopolysiloxane polymer or polymers in the presence of an end-coupling catalyst selected from the class consisting of Brónsted acids, Lewis acids, stearic acid treated calcium carbonate, and amines and mixtures thereof. The amines can either be primary, secondary or tertiary amines. The more basic the amine the better it is as a catalyst. The most preferred catalyst is one of the acids indicated above and most preferably is a combination of one of the acids with an amine. For information as to such catalysts and the end-coupling reactions one is referred to the disclosure of Chung, U.S. Pat. No. 4,515,932 which is hereby incorporated by reference.

After the polymers have been formed, there may be incorporated one of the scavengers indicated in the above disclosures in which the first base polymer system is in an all-alkoxy system. There is also disclosed in the foregoing all alkoxy system that is the blend of the polymers of Formulas (1) and (2) that the first polymer may be as represented by Formula (14). Such a polymer is not disclosed in White et. al. or any of the other patent applications. Further, such a polymer of Formula (14) does not need any of the monoalkoxy diorganopolyisiloxane polymer of Formula (2) in terms of novelty or to operate effectively and can operate 100% by itself as a base polymer for the production of an effective fast curing shelf stable one component RTV compositions.

Accordingly, a one component RTV silicone rubber composition can be produced by mixing a diorganopolysiloxane polymer having a viscosity in the range of 100 to 1,000,000 centipoise at 25° C. and having just one alkoxy group in each terminal silicon atom in the polymer chain and having at least one hydrolyzable leaving group in each terminal silicon atom on the polymer chain where the hydrolyzable leaving group is selected from the group consisting of silazy, cyclic amido, amido, amino, carbamato, enoxy, imidate, isocyanato, oximato, thioisocyanato and ureido radicals and where the organic group is a $C_{1-13}$ monovalent hydrocarbon radical, and there is mixed with such polymer an effective amount of a condensation catalyst which preferably is a tin condensation catalyst as will be explained below. Preferably, the above diorganopolysiloxane polymer with the hydrolyzable leaving group has Formula (14). Again, in this compound as before, there can be alkoxy groups or hydrolyzable leaving groups or even silanol groups in the polymer chain initially when the polymer is formed. However, by reacting with an excess amount of the silane cross-linking agent that is utilized to produce the polymer of Formula (14)—such silanol groups will be converted to be substituted by an alkoxy silyl group having on it also possibly hydrolyzable leaving groups as defined above. As stated previously, such groups should be in a small amount otherwise they will result in unnecessary cross-linking in the composition.

Such a compound of Formula (14) can function effectively 100% by itself as a base polymer along with a condensation catalyst to produce an RTV system.

As noted previously the condensation catalyst and preferably a tin condensation catalyst has to be incorporated into the system otherwise the composition will not function and will not cure to the physical properties that is expected of an RTV silicone rubber composition. After this polymer has been formed there may be added any of the scavengers previously defined for the other embodiment in an effective amount and preferably as defined in White et al, and the other patent applications concerned with such scavenging and scavenger, cross-linker, systems.

It should be noted that there can be utilized in such composition, a scavenger or an integrated cross-linker scavenger in additional quantities to the base polymer. There also can be added to the polyalkoxy-terminated diorganopolysiloxane of Formula (1) along with the monoalkoxy-terminated diorganopolysiloxane of Formula (2) or to the monoalkoxy-terminated diorganopolysiloxane of Formula (14) a polyalkoxy-terminated polymer of the formula,

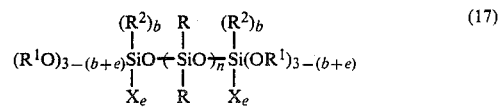

where R is a $C_{(1-13)}$ monovalent substituted or unsubstituted hydrocarbon radical, $R^1$ is a $C_{1-8}$ aliphatic organic radical selected from the group consisting of alkyl, alkyether, alkylester, alkylketone and alkylcyano radicals, or a $C_{7-13}$ aralkyl radical, $R^2$ is a $C_{1-13}$ monovalent substituted or unsubstituted hydrocarbon radical, X is a hydrolyzable leaving group selected from the group consisting of silazy, cyclic amido, amido, amino, carbamato, enoxy, imidato, isocyanato, oximato, thioisocyanato and ureido radicals and, b is a whole number equal to 0 or 1, e is a whole number equal to 0 or 1 inclusive and the sum of b+e is equal to 0 or 1 inclusive, and n is an integer having a value of from about 50 to 2,500 inclusive.

This polymer whose preparation is similar to that of the disclosed polymer Formula (14) can be added to the monoalkoxy-terminated diorganopolysiloxane polymer of Formula (14) or the polymer of Formula (1) and (2) in any quantities and is preferably added to 100 parts by weight of the compounds of either of Formulas (1) and (2) or (14) to from 10 to 1,000 parts by weight of the polyalkoxy diorganopolysiloxane of Formula (17). In such composition, there also may be other ingredients. Thus, there may be an effective amount of an excess of cross-linking agent of Formula (13) to promote a high cross-linking density and obtain high tensile strengths. There may also be present a cure accelerator as defined previously and as defined in the foregoing White et al. patent. There may be present any additional ingredients in such compositions such as fillers, sag control agents, adhesion promotors and plasticizers as will be defined below and as has been defined in the foregoing patent applications referred to in the background of the invention. Further, the polymer of Formula (14) may have the monoalkoxy terminated diorganopolysiloxane polymer of Formual (2) blended with it and may have a viscosity in the range of 5,000 to 200,000 centipoise at 25° C. It should be noted that the monoalkoxy terminated diorganopolysiloxane polymer of Formula (14) may be used 100% as the base polymer or may be used in varying quantities as part of the base polymer composition and it may be a blend with the polymer species of Formula (2) in which the blend is within the viscosity ranges indicated above. If the polymer species of Formula (2) is used then such a polymer blend may be utilized having 1 to 50 parts by weight of the monoalkoxy-terminated diorganopolysiloxane polymer of Formula (2) with 50 to 99 parts by weight of the monoalkoxy polymer of Formula (14).

Again any of the polymer of Formula (1) may be added in any quantities to the polymer of Formula (14). The foregoing scavenging systems disclosed previously and as defined in the foregoing patent applications whether integrated cross-linkers, scavengers or solely scavenging compounds may be added to the base compound of Formula (14) in the quantities defined in the foregoing patent applications and as will be explained below. In addition, with the monoalkoxy polymer of Formula (14), the polymer of Formula (2) can be present in the composition as stated above in the quantities indicated above and is preferably present in smaller quantities such as 1 to 10 parts per 90 to 99 parts of the polymer of Formula (14); but such a polymer does not have to be present.

As stated previously, such a polymer composition with a hydrolyzable leaving group and one alkoxy group in the terminal silicon atoms of the diorganapolysiloxane polymer has not been hereto defined and is the discovery of the instant inventor; whether by itself or with other polymers to form a base polymer blend and as has been explained above. Irrespective of the base polymers system as stated previously, there can be added any of the indicated scavenging compounds and integrated cross-linker, scavengers.

Such a polymer Formula (14) is formed by reacting in an anhydrous manner a silanol end-stopped diorganopolysiloxane polymer having a viscosity in the range of 100 to 1,000,000 centipoise at 25° C. and having a viscosity more preferably in the range of 5,000 to 200,000 centipoise at 25° C. where organo is a monovalent hydrocarbon radical with an intergrated cross-linker scavenger silane having just one alkoxy group per molecule and having at least two hydrolyzable leaving groups selected from the group consisting of cyclic amido, silazy, amino, carbamato, enoxy, imidato, isocyanato, oximato, thioisocyanato and ureido radicals and in the presence of the end coupling catalyst is defined in Chung, U.S. Pat. No. 4,515,932. The end-coupling catalyst and the conditions of the end coupling reaction as well as the concentration of the reactants are set forth in the foregoing Chung, which is hereby incorporated by reference.

The silanol end-stopped polymer preferably has Formula (16). The integrated cross-linker, scavenger which is reacted in the above reaction preferably has the formula

where $R^1$ is a $C_{1-8}$ aliphatic organic radical selected from the group consisting of alkyl, alkylether, alkylester, alkylketone and alkylcyano radicals, or a $C_{7-13}$ aralkyl radical, $R^2$ is a $C_{1-13}$ monovalent substituted or unsubstituted hydrocarbon radical, X is a hydrolyzable leaving group selected from the group consisting of cyclic, amido, silazy, amido, amino, carbamato, enoxy, imidato, isocyanato, oximato, thioisocyanato and ureido radicals; and q is an integer equal to 2 or 3 inclusive, b is a whole number equal to 0 to 1 inclusive, and the sum of b+q is equal to 2 or 3 inclusive and the silane is both the silane scavenger for hydroxy functional groups and a polyalkoxysilane cross-linking agent for terminating the silicon atom at each organopolysiloxane chain end with just one alkoxy radical. All the patents and patent applications referred to herein are incorporated by reference.

In this reaction, there must be utilized an integrated cross-linker scavenger compound of either Formula (18) above or one of the ones which are indicated in slightly different formula of Formulas (3) through (7). Once the monoalkoxy terminated diorganopolysiloxane polymer or Formula (14) is formed there may be added to it any of the scavenger compounds indicated previously, in any of the quantities disclosed in the foregoing patent applications and particularly White al., U.S. Pat. No. 4,395,526, so as to scavenge any free hydroxy groups that are either in the composition or becoming incorporated in the base polymer composition thru the incorporation of various ingredients into it such as fillers, plasticizing agents, adhesion promotors, etc. As indicated previously, there must be present in addition to the base polymer or polymers indicated above of the instant composition an effective amount of tin condensation catalyst otherwise the composition will not cure properly.

Effective amounts of the condensation catalysts which can be used in the practice of the present invention to facilitate the cure of the RTV compositions are, for example, 0.001 to 1 part based on the weight of 100 parts of the alkoxy-terminated polydiorganosiloxane polymer or a blend of such polymers. There are included tin compounds, for example, dibutyltindilaurate; dibutyltindiacetate; dibutyltindimethoxide; carbomethoxyphenyl tin trisuberate; tin octoate; isobutyl tin triceroate; dimethyl tin dibutyrate; dimethyl tin dineodeconoate; triethyl tin tartrate; dibutyl tin dibenzoate; tin oleate; tin naphthenate; butyltintri-2-ethylhexoate; tin butyrate. The preferred condensation catalysts are tin compounds and dibutyltindiacetate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition beta-dicarbonyltitanium compounds as shown by Weyenberg U.S. Pat. No. 3,334,067 can be used as condensation catalysts in the present invention.

Zirconium compounds, for example, zirconium octoate, also can be used.

Further examples of metal condensation catalysts are, for example, lead 2-ethyloctoate; iron 2-ethylhexoate; zind 2-ethylhexoate; antimony octoate; bismuth naphthenate; zinc naphthenate; zinc stearate.

Examples of nonmetal condensation catalysts are hexylammonium acetate and benzyltrimethylammonium acetate.

Various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate etc. The amounts of filler used can obviously be varied withing wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of the organopolysiloxane polymer or polymers can be employed. In such applications, the filler can consist of a major amount of extending materials, such as ground quartz, calcium carbonate, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 50 parts of a reinforcing filler, such as fumed silica filler, per 100 parts of alkoxy-terminated base organopolysiloxane polymer or polymers is utilized.

Examples of the preferable reinforcing fillers are selected from fumed silica and precipitated silica which are most preferably utilized at a concentration of 1 to 50 parts by weight of the base polymer system. Further, it is preferred that if reinforcing fillers are utilized that they be treated with polysiloxanes as disclosed in Lucas U.S. Pat. No. 2,938,009 and Lichtenwalner U.S. Pat. No. 3,004,859 and in addition with silazanes as disclosed in Smith, U.S. Pat. No. 3,635,743. If an extending filler is utilized such as calcium carbonate, it is preferably treated with stearic acid. There can be utilized any of the cure accelerators as disclosed in the foregoing White, et al patent.

Further in the level of scavenger that can be used in the practice of the invention, the total hydroxy functionality in the RTV composition has to be estimated. The total hydroxy functionality of the polymer can be determined by infared analysis in order to assure an an effective amount of stabilizing scavenger is used to maintain the stability of the composition over an extended shelf period of six months or more at ambient temperatures while in a sealed container. There can be used an additional amount of scavenger over that amount required to end-stop the polymer. This excess scavenger can be up to about 3% by weight based on the weight of the base polymer. The aforementioned 3% by weight of the scavenger exceeds that amount required to substantially eliminate the available hydroxy functionality in the polymer as a result of reaction between hydroxy functionality and X radicals. In compositions which also contains filler and other additives the additional amount of scavenger or integrated cross-linker scavenger which is required is estimated by running a 48 hour stability check at 100° C. to determine whether tack free time remains substantially unchanged as compared to the tack free time of the composition before aging measured under substantially the same conditions. A more specific rule, is that there can be used from at least 0.5 to up to 10 parts by weight of the scavenger or integrated cross-linker, scavenger per 100 parts by weight of the base polymer in any composition of the instant case. In addition to these ingredients there can be utilized in the composition tri-functional plasticizers, linear plasticizers, adhesion promoters, sag-control agents and other ingredients as disclosed in the patent applications of Beers, U.S. Pat. No. 4,513,115, and Lucas et al, U.S. Pat. No. 4,483,973 in the concentrations indicated therein as well as in any of the other foregoing patent applications. Thus to 100 parts of the base polymer system that may be incorporated into the composition from 2 to 20 parts by weight of the base organopolysiloxane of a plasticizer fluid polysiloxane containing a high degree of trifunctionality and mixtures of tri and tetra functionality and comprising (i) from 5 to 60 mole percent of monoalkylsiloxy, siloxy units or a mixture of such units;

(ii) from 1 to 6 mole percent of trialkylsiloxy units and (iii) from 34 to 94 mole percent of dialkylsiloxy units, said polysiloxane containing from about 0.1 to about 2% by weight of silicon-bonded hydroxyl groups. Per 100 parts of the base polymer system there may be incorporated in the composition form 0.1 to 10 parts by weight over an adhesion promotor which can be any of the one disclosed in the foregoing patent application. Further in addition, per 100 parts of the base polymer blend there can be incorporated into the composition from 10 to 50 parts by weight of triorganosiloxy end-stopped diorganopolysiloxane polymer having from 100 to 20,000 centipoise viscosity at 25° C. where the organo group is $C_{1-8}$ monovalent hydrocarbon radical and is most preferably an alkyl radical of $C_{1-8}$. Such a linear plasticizer fluid has generally from 100 part to 1,100 parts per million of silanol groups in it as a result of the process by which it is made.

A scavenger compound must be utilized in such compositions if the above compounds are to be incorporated in the RTV system. In addition, there may be other ingredients such as sag control, poly ether additives, castor oil additives, etc. Any other ingredients known common to such one-component RTV systems may be added to the instant composition. For more information as to such additives, one is referred to Beers, U.S. Pat. No. 4,513,185 and Lucas, U.S. Pat. No. 4,417,042. Further, for a description of an alternate method of producing the polymers of Formulas (1) and (2) reference is made to the methods of the patent of Lucas U.S. Pat. No. 4,599,394 entitled, "Process for Producing Alkoxy-Terminated Polysiloxanes". Thus, generally the polymers of Formulas (1) and (2) that is the diorganopolysiloxane polymers of Formulas (1) and (2) may be produced by reacting a vinyl terminated diorganopolysiloxene polymer having a viscosity in the range of 100 to 1,000,000 centipoise at 25° C. and more preferably having a viscosity in the range of 5,000 to 200,000 centipoise at 25° C. or a silanol terminated diorganopolysiloxane polymer having a viscosity in the range of 100 to 1,000,000 centipoise at 25° C. and more preferably having a viscosity in the range of 5,000 to 200,000 centipoise at 25° C. with a hydrogen contained polyalkoxy silane compound in the presence of a platinium catalyst. Preferably the platinium catalyst as disclosed in the foregoing patent application is present at a concentration of anywhere from 1 to 500 parts per million of platinium. For more information as to the details by which such polymers are produced one is referred to the disclosure of Lucas, U.S. Pat. No. 4,599,394. The silanol polymer defined in the above process is the same as the silanol polymer as defined previously with respect to the compositions of the instant case. The radical defined in any of the foregoing formulas above be selected for example from aryl radicals and halogenated aryl radicals, such as phenyl, tolyl, chlorophenyl, naphthyl; aliphatic and cycloaliphatic radicals, for example, cyclohexyl, cyclobutyl; alkyl and alkenyl radicals, such as methyl, ehtyl, propyl, chloropropyl, vinyl, allyl, trifluoropropyl; and cyanoalkyl radicals, for example, cyanoethyl, cyanopropyl, cyanobutyl. Radicals preferably included with $R^1$ are, for example, $C_{1-8}$ alkyl radicals, for example, methyl, ethyl, propyl, butyl, pentyl; $C_{7-13}$ aralkyl radicals, for example, benzyl; phenylethyl; alkylether radicals such as 2-methoxyethyl; alkylester radicals, for example 2-acetoxyethyl, alkylketone radicals, for example 1 butan-3 onyl; alkylcyano radicals, for example 2-cyanoethyl. Radicals included with $R^2$ are the same or different radicals included within R radicals. Each R, R¹, R², radical in each formula is independently selected from any of these radicals cited above having $C_{1-13}$ atoms. Further, the R radical can be a $C_{1-13}$ monovalent substitute or unsubstituted hydrocarbon radical. It is preferably solected from methyl or a mixture of a major amount of methyl and a minor amount of phenyl, trifluoropropyl, vinyl and mixtures thereof. In addition, in all the foregoing formulas preferably "n" has a value from 50 to 2500 and more preferably has a value from 500 to 2,000.

Finally, the compositions of these cases can be mixed and prepared in accordance with the methods—of White et al, U.S. Pat. No. 4,395,526. If it is desired to produce them continuously, then the utilization of a static mixture and a devolitilizing extruder as disclosed in Chung, U.S. Pat. No. 4,515,932 is preferred.

Generally such compositions are prepared by desirably first preparing the alkoxy-terminated diorganopolysiloxane polymer of either of the above embodiments of the instant invention that is preparing the base polymer system. Then there is preferably added to such sub-system the scavenger and then all the other ingredients that are necessary and desirable to prepare the composition such as fillers, excess cross-linking agent, adhesion promotors, etc. Once the base polymer composition is prepared and it should be prepared anhydrously; it is preferred that all the other ingredients be added anhydrously and the composition be packaged in an anhydrous state. When it is desired to use the composition the seal on the package is broken and the composition is applied in whatever manner it is desired. The composition will then cure to a silicone elastomer with final cure taking place within 24 to 72 hours.

The examples below are given for the purpose of illustrating the present invention. They are not given for setting limits or boundaries to the instant invention. All parts in the examples are by weight.

EXAMPLE 1

There was prepared in a 3-neck flask fitted with a mechanical stirrer pot thermometer, water reflex condenser with $N_2$ gas inlet port, and 500 mm pressure equalizing addition funnel; the monomethoxy silane. The flask was charged with 2751 parts of toluene and 48 parts of methanol and 300 parts of triethylamine. The methanol, triethylamine solution was added to a rapidly stirring pot mixture for a 30 minute period. The addition funnel was recharged with a mixture of 146.2 parts of N-methylacetamide and 300 of triethylamine. The acetamide, amine solution was added to a rapidly stirring pot temperature over a 60 minute period. The reaction mixture was stirred an additional six hours at room temperature after the completion of the addition of these ingredients. A slight exotherm was observed during the methoxylation and amidation steps given rise to a pot temperature increase from 42° C. to 45° C. Copious amounts of solid white triethylamine hydrochloride formed during the course of the reaction. After completion of the reaction the solids were removed by vacuum filtration carried on in a dry box. Liquid volatiles were removed via rotary flask operation at 70° C. and 10 mm mercury. The product was isolated as a residue amber liquid and fully characterized by protron Nuclear Magnetic Resonance and Gas Chromatography Mass Spectroscopy.

This integrated cross-linking scavenger was then compounded with a methyl, dimethoxy terminated polymer under anhydrous conditions using a Semkit ® mixer. In the first catalyzation step in a Semkit ® mixer that was added 85 parts of methyl, dimethoxy terminated diorganopolysiloxane polymer having a 3,000 centipoise viscosity at 25° C. and 15 parts of fumed silica which had been treated with octomethylcyclotetrasiloxane: various parts of silane as indicated in Table I below and as a plasticizing fluid 1.0 parts of a trimethysiloxy end-stopped dimethylpolysiloxane having a viscosity of 100 centipoise at 25° C. and having 500-700 parts per million of silanol. The foregoing ingredients were mixed for 15 minutes at room temperature. In a second mixing step, there was mixed for 15 minutes at room temperature into the foregoing composition 0.23 parts of dibutyl tin diacetate and 1.0 parts of the trimethylsiloxy end-stopped dimethylpolysiloxane polymer identified above. After mixing the RTV compositions were packaged into sealed aluminum tubes and stored 24 hours at room temperature and 24 hours at 100° C. and 48 hours at 100° C. prior to exposure to a room temperature—50% relative humidity curing environment. Speed and degree of cure was determined by tack free time at 24 hour durometer measurements. Acceptable cure is defined by tack free time 60 minutes or less and 24 hours durometer of 20 or above. The results are given in Table I below.

TABLE I

| $Ch_3Si(OCH_3)(NMA)_2$/Dimethylpolysiloxane Results | | | | |
|---|---|---|---|---|
| $CH_3Si(OCH_3)(NMA)_2$ LEVEL (parts) | SHELF AGE DAYS | AGE TEMP. (°C.) | TFT (MIN.) | 24 hr. DUROMETER |
| 1 | 1 | RT | 35 | 24 |
| | 1 | 100 | 15 | 25 |
| | 2 | 100 | 35 | 26 |
| 1.5 | 1 | RT | 35 | 23 |
| | 1 | 100 | 30 | 22 |
| | 2 | 100 | 35 | 23 |
| 2.0 | 1 | RT | 35 | 27 |
| | 1 | 100 | 15 | 25 |
| | 2 | 100 | 35 | 26 |

EXAMPLE 2

The same procedure was followed as Example 1 to produce methylmethoxy-bis-dipropylaminosilane in place of the acetamide silane of Example 1. However, there was utilized in such reaction procedure 2,750 parts of hexane, 148 parts of methyltrichlorosilane, 32 parts of methanol and 404.8 parts of dipropylamine. The product was isolated as a clear pale yellow residue liquid as 81% methylmethoxy-bis-dipropylaminosilane and identified by Gas Chromatography Spectroscopy and protron Nuclear Magnetic Resonance Spectroscopy. A similar compounding procedure was followed as in Example 1 except in the first catalyzation step in a 15 minute mixing step at room temperature and in a Semkit ® mixer there was mixed anhydrously 85 parts by weight of a methyl dimethoxy terminated dimethylpolysiloxane polymer of 3,000 centipoise at 25° C.,, 15 parts of a octomethylcyclotetrasiloxane treated fumed silica. To these ingredients in the first mixing step there was added the bis-dipropylamino silane as indicated in TABLE II below and 1.0 part of the same plasticizing fluid of Example 1 of 100 centipoise viscosity at 25° C.c. This first mixture, was then catalyzed in a second catalyzation step for 15 minutes at room temperature in the same Semkit ® mixer with 0.23 parts dibutyl tin diacetate and 5.0 parts of the same plasticizing fluid of 100 centipoise viscosity of Example 1. The tack free time and durometer for various aging times is indicated in Table II below. The testing and compounding procedure of such compositions was the same as described in more detail in Example 1.

TABLE II

| CH$_3$Si(OCH$_3$)(N(Propyl)$_2$)$_2$/Dimethylpolysiloxane Results | | | | |
|---|---|---|---|---|
| CH$_3$Si(OCH$_3$) (N(Propyl)$_2$)$_2$ LEVEL (Parts) | AGE TIME (DAYS) | AGE TEMP. (°C.) | TFT (MIN.) | 24 hr. DUROMETER |
| 1.0 | 1 | RT | 60 | 17 |
|  | 1 | 100 | 50 | 20 |
|  | 2 | 100 | 75 | 18 |
| 1.5 | 1 | RT | 35 | 18 |
|  | 1 | 100 | 30 | 22 |
|  | 2 | 100 | 35 | 21 |
| 2.0 | 1 | RT | 35 | 21 |
|  | 1 | 100 | 15 | 22 |
|  | 2 | 100 | 35 | 26 |

It should be noted that in both Examples 1 and 2 the foregoing cross-linking integrated scavengers will equilibriate with the alkoxy terminated polymer to substitute in most of the polymer specie the monomethoxy, acetamido group, and dipropyl amino group for the dimethoxy groups in the base methyldimethoxy terminated polymer. Accordingly, the results given above in Tables 1 and 2 are basically of the curing properties of such a polymer.

EXAMPLE 3

The methyldimethoxy-bis-dipropylamino silane as prepared in Example II was taken and compounded with various ingredients in accordance with this Example. Thus, this integrated cross-linker, scavenger was compounded with 85 parts by weight of a silanol endstopped dimethylpolysiloxane polymer of 3,000 centipoise viscosity at 25° C., 15 parts of octomethylcyclotetrasiloxane treated fumed silica and 3 to 7 parts as indicated in Table II below of the bis-dipropylamino silane. This mixing was carried out in a first mixing step in a Semkit ® mixer for 15 minutes at room temperature. After this first mixing step, then the mixture was catalized with additional ingredients comprising 0.23 parts of dibutyltin diacetate and 5.0 parts of the same plasticizing polymer of Example 1. The second mixing step was carried out in the same Semkit ® mixer for 15 minutes at room temperature. After that time, the compositions were compounded in the same manner as indicated in the Example 1 and as described above and then tested for tack free time and durometer. The results are set forth in Table III below.

As the results show above the foregoing compositions and in particular, the compositions of Example 3 in which the base polymer was substantially 100% of the monomethoxy terminated polymer within the scope of the Formula (17) above had good curing rates, shelf stability and cured physical properties.

EXAMPLE 4

A polydimethylsiloxane polymer, in which 45% of the endgroups are —Si(Me)$_2$(OMe) groups and 55% are —Si(Me)(OMe)$_2$ groups, (where Me stands for methyl) was prepared by reacting 100 parts of a silanol endstopped dimethylpolysiloxane polymer having a viscosity of 120,000 centipoise at 25° C. with 2.0 parts of a mixture consisting of 0.40 parts of Me$_2$si(OMe)$_2$, 0.60 parts MeSi(OMe)$_3$, 0.3 parts of dihexylamine, and 0.05 parts of acetic acid. A 3-neck, 300 ml round-bottom flask fitted with overhead stirrer, thermometer and heating mantle was used. The polymer and catalyst solution was heated to 80° C. for 2.5 hours to effect endcapping. After all the silanols are end-capped, 0.5 parts of hexamethyldisilazane was added to quench the reaction. The presence of 45% monomethoxy endcapped polymer was confirmed by proton Nuclear Magnetic Resonance Spectroscopy.

The 45% by weight monomethoxy, 55% by weight of dimethoxy endstopped base polymer of 120,000 centipoise viscosity at 25° C. was compounded into a sealant. In a 2 gallon Baker-Perkins batch mixer there was mixed anhydrously, 100 parts of the base polymer mixture; 17 parts of a octomethylcylotetrasiloxane treated fumed silane; 20 parts of a trimethylsiloxy end-stepped dimethylpolysiloxane of 100 centipoise viscosity at 25° C. and having a silanol content of 200 parts per million; 10 parts of a trifunctional plasticizing fluid; 0.2 parts of Pluracol V-7 which is a polyether sold by Wyandotte Chemical Co.; and 3.0 parts of hexamethyldisilazane. The trifunctional fluid comprised, 3 mole percent trimethylsiloxy monofunctional units, 20 mole percent methylsiloxy trifunctional units, 27 mole percent dimethylsiloxy difunctional units having a viscosity of 50 centipoise at 25° C. and 0.5 weight percent silanol. The mixing was carried out for 15 minutes.

In a second mixing step the first mixture was catalyzed anhydrously in a Semkit ® mixer for 15 minutes with 1.4 parts of aminoethylaminopropyltrimethoxysilane; 0.7 parts of methyltrimethoxy silane; and 0.5 parts of dibutyltindiacetate.

Cured and uncured physical properties were measured with the following results shown in Table IV below:

TABLE III

| CH$_3$Si(OCH$_3$)—(N(Propyl)$_2$)$_2$/Dimethyl Polysiloxane Results | | | | |
|---|---|---|---|---|
| CH$_3$Si(OCH$_3$)—(N(Propyl)$_2$)$_2$ LEVEL (Parts) | AGE TIME (DAYS) | AGE TEMP. (°C.) | TFT (MIN.) | 24 hr. DUROMETER |
| 3 | 1 | RT | \multicolumn{2}{c}{Gelled in tube} |
| 4 | 1 | RT | \multicolumn{2}{c}{Partial gellation in tube} |
| 5 | 1 | RT | 25 | 28 |
|  | 1 | 100 | 35 | 29 |
|  | 2 | 100 | 35 | 27 |
| 6 | 1 | RT | 30 | 24 |
|  | 1 | 100 | 20 | 26 |
|  | 2 | 100 | 20 | 24 |
| 7 | 1 | RT | 40 | 21 |
|  | 1 | 100 | 45 | 23 |
|  | 2 | 100 | 30 | 24 |

TABLE IV

| Room Temp. Aged Physicals* | |
| --- | --- |
| TFT: | 60 min. |
| Durometer Shore A: | 13 |
| Tensile (psi): | 158 |
| Elongation (%): | 510 |
| Acc. Aging 48 hrs. 100° c.* | |
| TFT: | 60 min. |
| Durometer Shore A: | 17 |
| Tensile (psi): | 206 |
| Elongation (%): | 590 |

*7 day cure 72° F., 50% R.H.

As the results in Table IV indicate there was produced a RTV composition which was shelf stable with acceptable physical properties.

What is claimed is:

1. A one component RTV silicone rubber composition comprising
    (A) 50 to 99 parts by weight of a first diorganopolysiloxane polymer terminated on each end of the polymer chain by at least 2 alkoxy radicals and having a viscosity ranging from 100 to 1,000,000 centipoise at 25° C. where the organic group is $C_{1-13}$ monovalent hydrocarbon radical.
    (B) from 1 to 50 parts by weight of a second diorganopolysiloxane polymer having on each terminal silicon atom in the polymer chain just one alkoxy group and having a viscosity varying in the range of 100 to 1,000,000 centipoise at 25° C. where organo is a $C_{1-13}$ monovalent hydrocarbon radical, and 2. The composition of claim 1 wherein said first polymer has the formula:

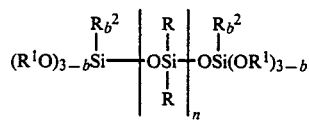

where R is independently selected from a $C_{1-13}$ monovalent hydrocarbon radical, $R^1$ is independently selected from a $C_{1-13}$ monovalent hydrocarbon radical and $R^2$ is independently selected from a $C_{1-13}$ monovalent hydrocarbon radical, n is a whole number that varies from 50 to 2500 and b is a whole number that is 0 or 1.

3. The composition of claim 2 wherein the second polymer has the formula,

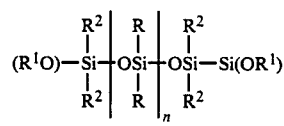

where R, $R^1$, $R^2$ and n are as previously defined.

4. The composition of claim 3 wherein there is present an effective amount of a scavenger for free hydroxyl groups.

5. The composition of claim 4 wherein the scavenger is selected from the class consisting of the formula:

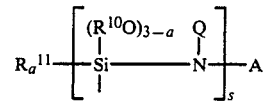

and cyclic silyl nitrogen scavengers having at least one or all of the units of the formula:

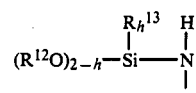

and the rest of the units if any, having the formula:

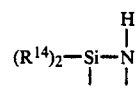

where $R^{10}$ is a $C_{1-8}$ aliphatic organic radical selected from the group consisting of alkyl, alkylether, alkylester, alkylketone, alkylcyano, and aryl, $R^{11}$ is a $C_{1-8}$ monovalent substituted or unsubstituted hydrocarbon radical, Q is selected from hydrogen, $C_{1-8}$ monovalent substituted or unsustituted hydrocarbon radicals or radicals of the formula:

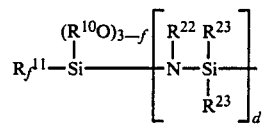

where $R^{10}$, $R^{11}$, are as previously defined, where a varies from 0 to 2, f varies from 0 to 3, h is 0 or 1, where s is a whole number that varies from 1 to 25, d is a whole number that varies from 1 to 25, $R^{22}$ is selected from hydrogen or $C_{1-8}$ monovalent hydrocarbon radicals and $R^{23}$ is independently selected from $C_{1-8}$ hydrocarbon or hydrocarbonoxy radicals, A is selected from the class consisting of hydrogen and $C_{1-8}$ monovalent substituted hydrocarbon radicals and $C_{1-8}$ monovalent unsubstituted hydrocarbon radicals and radicals of the formula:

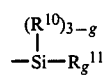

where $R^{10}$, $R^{11}$ are as previously defined, g varies from 0 to 3 and in the above scavengers there is at least one hydrocarbonoxy group in the molecule, $R^{12}$ is defined the same as $R^{10}$, and $R^{13}$, is defined the same as $R^{11}$, and $R^{14}$ is defined as $R^{11}$.

6. The composition of claim 4 wherein the silane scavenger for hydroxy functional groups is a silicon-nitrogen compound selected from the class consisting of:

(A) a silicon-nitrogen compound having the formula:

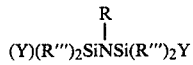

where Y is selected from R''' or R''$_2$N and
(B) a silicon-nitrogen polymer comprising:
(1) from 3 to 100 mole percent chemically combined structural units having the formula:

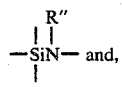

(2) from 0 to 97 mole percent chemically combined structural units represented by the formula:

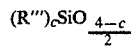

where the silicon atoms of said silicon-nitrogen polymer are joined to each other by a member selected from an SiOSi linkage or a SiNR''Si linkage, the free valances of said silicon atoms other than those joined to oxygen to form a siloxy unit and nitrogen to form a silazy unit are joined to a member selected from an R''' radical or (R'')$_2$N radical, and where the ratio of the sum of said R''' radicals and said (R'')$_2$N radicals to the silicon atoms of said silicon-nitrogen polymer has a value of 1.5 to 3, inclusive, and R'' is a member selected from the class consisting of hydrogen and monovalent hydrocarbon radicals, or fluoroalkyl radicals, R''' is a member selected from hydrogen, monovalent hydrocarbon radicals or fluoroalkyl radicals, and c is a whole number equal to 0 to 3, inclusive.

7. The composition of claim 4 wherein there is present a stabilizing amount of silane scavenger for hydroxy-functional groups having the formula

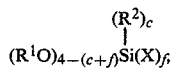

where $R^1$ is a $C_{1-8}$ aliphatic organic radical selected from the group consisting of alkyl, alkylether, alkylester, alkylketone, and alkylcyano radicals, or a $C_{7-13}$ aralkyl radical, $R^2$ is a $C_{1-13}$ monovalent substituted or unsubstituted hydrocarbon radical, X is a hydrolyzable leaving group selected from the group consisting of silazy, cyclic amido, amido, amino, carbamato, enoxy, imidato, isocyanato, oximato, thioisocyanato and ureido radicals and, c is a whole number equal to 0 to 3 inclusive, f is an integer equal to 1 to 4 inclusive and the sum of c+f is equal to 1 to 4 inclusive.

8. The composition of claim 7 wherein the silane scavenger has the formula

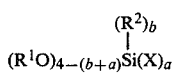

where $R^1$ is a $C_{1-8}$ aliphatic organic radical selected from the group consisting of alkyl, alkylether, alkylester, alkylketone and alkylcyano radicals, or a $C_{7-13}$ aralkyl radical, $R^2$ is a $C_{1-13}$ monovalent substituted or unsubstituted hydrocarbon radical, X is a hydrolyzable leaving group selected from the group consisting of silazy, cyclic amido, amido, amino, carbamato, enoxy, imidato, isocyanato, oximato, thioisocyanato and ureido radicals; and, a is an integer equal to 1 to 2 inclusive, b is a whole number equal to 0 to 1 inclusive, and the sum of b+a is equal to 1 to 2 inclusive and the silane is both the silane scavenger for hydroxy-functional groups and a polyalkoxysilane cross-linking agent.

9. The composition of claim 7 where there is further present a polyalkoxy-terminated organopolysiloxane which has the formula

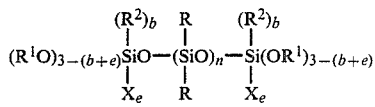

where R is independently selected from a $C_{1-13}$ monovalent substituted or unsubstituted hydrocarbon radical, $R^1$ is independently selected from a $C_{1-8}$ aliphatic organic radical selected from the group consisting of alkyl, alkylether, alkylester, alkylketone and alkylcyano radicals, or a $C_{7-13}$ arakyl radical, $R^2$ is independently selected from a $C_{1-13}$ monovalent substituted or unsubstituted hydrocarbon radical, X is a hydrolyzable leaving group selected from the group consisting of silazy, cyclic amido, amido, amino, carbamato, enoxy, imidato, isocyanato, oximato, thioisocyanato and ureido radicals and b is a whole number equal to 0 or 1, e is a whole number equal to 0 or 1 inclusive and the sum of b+e is equal to 0 or 1 inclusive, and n is an integer having a value of from about 50 to 2,500 inclusive.

10. A room temperature vulcanizable composition in accordance with claim 7 having an effective amount of a cross-linking silane of the formula

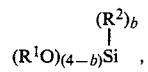

where $R^1$ is a $C_{1-8}$ aliphatic organic radical selected from the group consisting of alkyl, alkylether, alkylester, alkylketone and alkylcyano radicals, or a $C_{7-13}$ aralkyl radical, $R^2$ is a $C_{1-13}$ monovalent substituted or unsubstituted hydrocarbon radical, and b is a whole number equal to 0 or 1.

11. A room temperature vulcanizable composition in accordance of claim 10, which contains a tin compound as the condensation catalyst.

12. A room temperature vulcanizable composition in accordance with claim 11, where R, $R^1$ and $R^2$ are methyl and which has a tin compound as a condensation catalyst.

13. A room temperature vulcanizable composition in accordance with claim 7, containing an effective amount of a cure accelerator selected from amines.

14. An RTV composition in accordance with claim 13, containing dibutyltindiacetate as the condensation catalyst.

15. A one-package room temperature vulcanizable composition in accordance with claim 10, where the silane is methyltrimethoxysilane.

16. The composition of claim 13 containing dimethyltindioxide as the condensation catalyst.

17. A process for producing the composition of claim 1 comprising:

(a) forming the first polymer by reacting anhydrously in a mixture:
(i) a silanol-terminated diorganopolysiloxane polymer having a viscosity in the range of 100 to 1,000,000 centipoise at 25° C. where organo is a monovalent hydrocarbon radical, with
(ii) a polyalkoxy silane cross-linking agent of the formula:

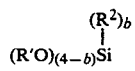

in the presence of an end-coupling catalyst of Lewis acids, amines or mixtures thereof
(b) forming the second polymer by reacting in a separate mixture
(iii) a silanol terminated diorganopolysiloxane polymer having a viscosity in the range of 100 to 1,000,000 centipoise at 25° C. where organo is a monovalent hydrocarbon radical with,
(iv) a dialkoxy silane of the formula:

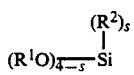

in the presence of an end-coupling catalyst of Lewis acids, amines or mixtures thereof where $R^1$ and $R^2$ are $C_{1-13}$ monovalent hydrocarbon radicals, s is a whole number that is 2, and b is a whole number that is 0 or 1, and
(c) blending said first and second polymer with said condensation catalyst.

18. The process of claim 17 wherein there is further blended an effective amount of a scavenger for hydroxyl groups.

19. The process of claim 18 wherein the scavenger for hydroxy-functional groups is selected from the class consisting of a non-cyclic silyl nitrogen scavenger of the formula:

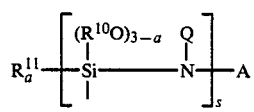

and cyclic silyl nitrogen scavengers having at least one or all of the units of formula:

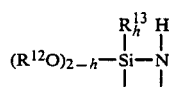

and the rest of the units, if any, having the formula:

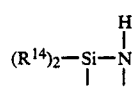

where $R^{10}$ is a $C_{1-8}$ aliphatic organic radical selected from the group consisting of alkyl, alkylether, alkylester, alkylketone, alkylcyano, and aryl, $R^{11}$ is a $C_{1-8}$ monovalent substituted or unsubstituted hydrocarbon radical, Q is selected from hydrogen, $C_{1-8}$ monovalent substituted or unsubstituted hydrocarbon radicals or radicals of the formula:

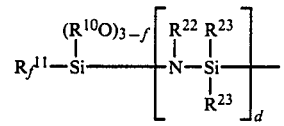

where $R^{10}$, $R^{11}$ are as previously defined, where a varies from 0 to 2, f varies from 0 to 3, h is 0 or 1, where s is a whole number that varies from 1 to 25, d is a whole number that varies from 1 to 25, $R^{22}$ is selected from hydrogen or $C_{1-8}$ monovalent hydrocarbon radicals and $R^{23}$ is independently selected selected from $C_{1-8}$ hydrocarbon or hydrocarbonoxy radicals, A is selected from the class consisting of hydrogen and $C_{1-8}$ monovalent substituted hydrocarbon radicals and $C_{1-8}$ monovalent unsubstituted hydrocarbon radicals and radicals of the formula:

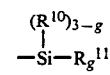

where $R^{10}$, $R^{11}$ are as previously defined, g varies from 0 to 3 and in the above scavengers there is at least one hydrocarbonoxy group in the molecule, $R^{12}$ is defined the same as $R^{10}$, and $R^{13}$ is defined the same as $R^{11}$, and $R^{14}$ is defined the same as $R^{11}$.

20. The process of claim 18 wherein the stabilizing amount of silane scavenger for hydroxy-functional groups is a silicon-nitrogen compound selected from the class consisting of:
(A) a silicon-nitrogen compound having the formula:

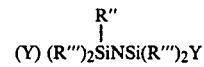

where Y is selected from R''' and R''$_2$N— and
(B) a silicon-nitrogen polymer comprising:
(1) from 3 to 100 mole percent chemically combined structural units having the formula:

and (2) from 0 to 97 mole percent chemically combined structural units represented by the formula:

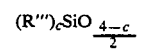

where the silicon atoms of said silicon-nitrogen polymer are joined to each other by a member selected from an SiOSi linkage or SiNR'' Si linkage, the free valances of said silicon atoms other than those joined to oxygen to form a siloxy unit and nitrogen to form a silazy unit are joined to a member selected from an R''' radical or (R'')$_2$N radical, and where the ratio of the sum of said R''' radicals and said (R'')$_2$N radicals to the silicon atoms of said silicon-nitrogen polymer has a value of 1.5 to 3, inclusive, and R'' is a member selected from the class consisting of hydrogen and monovalent hydrocarbon radicals, and fluoroalkyl radicals, R''' is a member selected from hydrogen, monovalent hydrocarbon radicals or fluoroalkyl radicals, and c is a whole number equal to 0 to 3, inclusive.

21. The process of claim 18 wherein the stabilizing amount of silane scavenger for hydroxy-functional groups has the formula,

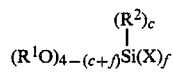

where $R^1$ is a $C_{1-8}$ aliphatic organic radical selected from the group consisting of alkyl, alkylether, alkylester, alkylketone, and alkylcyano radicals, or a $C_{7-13}$ aralkyl radical, $R^2$ is a $C_{1-13}$ monovalent substituted or unsubstituted hydrocarbon radical, X is a hydrolyzable leaving group selected from the group consisting of cyclic amido, silazy, amido, amino, carbamato, enoxy, imidato, isocyanato, oximato, thioisocyanato and ureido radicals and, c is a whole number euqal to 0 to 3 inclusive, f is an integer equal to 1 to 4 inclusive and the sum of c+f is equal to 1 to 4 inclusive.

22. The process of claim 21 wherein the scavenging silane has the formula

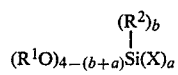

where $R^1$ is a $C_{1-8}$ aliphatic organic radical selected from the group consisting of alkyl, alkylether, alkylester, alkylketone and alkylcyano radicals, or a $C_{7-13}$ aralkyl radical, $R^2$ is a $C_{1-13}$ monovalent substituted or unsubstituted hydrocarbon radical, X is a hydrolyzable leaving group selected from the group consisting of silazy, cyclic amido, amido, amino, carbamato, enoxy, imidato, isocyanato, oximato, thioisocyanato and ureido radicals; and, a is an integer equal to 1 to 2 inclusive, b is a whole number equal to 0 ro 1 inclusive, and the sum of b+a is equal to 1 to 2 inclusive.

23. The process of claim 21 wherein there is further present a polyalkoxy-terminated organopolysiloxane which has the formula

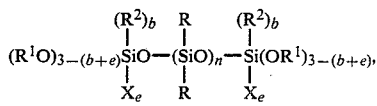

where R is independently selected from a $C_{1-13}$ monovalent substituted or unsubstituted hydrocarbon radical, $R^1$ is independently selected from a $C_{1-8}$ aliphatic organic radical selected from the group consisting of alkyl, alkylether, alkylester, alkylketone and alkylcyano radicals, or a $C_{7-13}$ aralkyl radical, $R^2$ is independently selected from a $C_{1-13}$ monovalent substituted or unsubstituted hydrocarbon radical, X is a hydrolyzable leaving group selected from the group consisting of cyclic amido, silazy, amido, amino, carbamato, enoxy, imidato, isocyanato, oximato, thioisocyanato and ureido radcials and, b is a whole number equal to 0 or 1, e is a whole number equal to 0 or 1 inclusive and the sum of b+e is equal to 0 or 1 inclusive and n is an integer having a value of from about 50 to 2,500 inclusive.

24. A process in accordance with claim 21 having an effective amount of a cross-linking silane of the formula

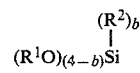

where $R^1$ is a $C_{1-8}$ aliphatic organic radical selected from the group consisting of alkyl, alkylether, alkylester, alkylketone and alkylcyano radicals and b is a whole number equal to 0 or 1.

25. A process in accordance with claim 21, which contains a tin compound as the condensation catalyst.

26. A process in accordance with claim 21, where $R^1$ and $R^2$ are methyl and which has a tin compound as a condensation catalyst.

27. A process in accordance with claim 21, containing an effective amount of a curing accelerator selected from amines.

28. The process of claim 17 wherein the silanol-terminated polymer has the formula,

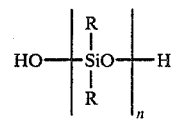

where R is independently selected from a $C_{1-13}$ monovalent hydrocarbon radical and n is a whole number that varies from 50 to 2,500.

29. A method to produce a one component RTV silicone rubber composition comprising:
(a) anhydrously reacting a mixture comprising:
   (i) a silanol-terminated diorganopolysiloxane polymer having a viscosity in the range of 100 to 1,000,000 centipoise at 25° C. where organo is a monovalent hydrocarbon radical,
   (ii) a polyalkoxy silane cross-linking agent of the formula,

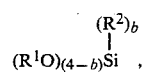

(iii) a dialkoxy silane of the formula

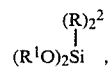

and
   (iv) an effective amount of end-coupling catalyst of Lewis acids, amines or mixtures thereof,
   wherein $R^1$ and $R^2$ are $C_{1-13}$ monovalent hydrocarbon radicals, b is a whole number that is 0 or 1, and component (ii) and (iii) are present in an amount to produce a ratio of diorganopolysiloxane polymers terminated on each end by at least 2 alkoxy radicals to diorganopolysiloxane polymers terminated on each end by just one alkoxy radicaly between about 99/1 to about 50/50, and (b) blending the resultant mixture with a condensation catalyst.

* * * * *